United States Patent
Ard et al.

(10) Patent No.: US 10,217,231 B2
(45) Date of Patent: Feb. 26, 2019

(54) SYSTEMS AND METHODS FOR UTILIZING ANCHOR GRAPHS IN MIXED REALITY ENVIRONMENTS

(71) Applicant: Microsoft Technology Licensing, LLC, Redmond, WA (US)

(72) Inventors: Tracy K. Ard, Sammamish, WA (US); Gabriel Takacs, Santa Clara, CA (US); David M. Gedye, Seattle, WA (US); James Fletcher, Kirkland, WA (US); Matthew Sammis Ashman, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/169,045

(22) Filed: May 31, 2016

(65) Prior Publication Data
US 2017/0345167 A1    Nov. 30, 2017

(51) Int. Cl.
| | | |
|---|---|---|
| *G09G 5/00* | (2006.01) | |
| *G06T 7/30* | (2017.01) | |
| *G02B 27/01* | (2006.01) | |
| *G03H 1/08* | (2006.01) | |
| *G06F 3/01* | (2006.01) | |
| *G06T 11/20* | (2006.01) | |

(Continued)

(52) U.S. Cl.
CPC .............. *G06T 7/30* (2017.01); *A63F 13/213* (2014.09); *A63F 13/65* (2014.09); *G02B 27/0172* (2013.01); *G03H 1/08* (2013.01); *G06F 3/011* (2013.01); *G06F 3/012* (2013.01); *G06T 7/55* (2017.01); *G06T 11/206* (2013.01); *G06T 15/20* (2013.01); *G06T 19/006* (2013.01); *H04W 4/023* (2013.01); *A63F 13/525* (2014.09); *G02B 2027/0174* (2013.01); *G06T 2215/16* (2013.01); *G06T 2219/024* (2013.01)

(58) Field of Classification Search
None
See application file for complete search history.

(56) References Cited

U.S. PATENT DOCUMENTS

| | | | | |
|---|---|---|---|---|
| 6,057,847 | A * | 5/2000 | Jenkins | .................... G06T 15/20 |
| | | | | 345/422 |
| 6,111,582 | A * | 8/2000 | Jenkins | .................... G06T 15/40 |
| | | | | 345/421 |

(Continued)

FOREIGN PATENT DOCUMENTS

EP    2977961    1/2016

OTHER PUBLICATIONS

A. Wendel, et al.—Natural landmark-based monocular localization for MAVs; Proc. 2011 IEEE International Conference on Robotics and Automation (ICRA 2011), pp. 5792-5799, 2011. (Year: 2011).*

(Continued)

*Primary Examiner* — Martin Mushambo
(74) *Attorney, Agent, or Firm* — Workman Nydegger

(57) ABSTRACT

Mixed-reality systems are provided for using anchor graphs within a mixed-reality environment. These systems utilize anchor vertexes that comprise at least one first key frame, a first mixed-reality element, and at least one first transform connecting the at least one first key frame to the first mixed-reality element. Anchor edges comprising transformations connect the anchor vertexes.

20 Claims, 7 Drawing Sheets

(51) Int. Cl.
  *G06T 15/20* (2011.01)
  *G06T 19/00* (2011.01)
  *H04W 4/02* (2018.01)
  *A63F 13/65* (2014.01)
  *A63F 13/213* (2014.01)
  *G06T 7/55* (2017.01)
  *A63F 13/525* (2014.01)

(56) References Cited

U.S. PATENT DOCUMENTS

| | | | | |
|---|---|---|---|---|
| 6,452,596 | B1* | 9/2002 | Gueziec | G06T 9/001 |
| | | | | 345/440 |
| 7,196,703 | B1* | 3/2007 | Moreton | G06T 17/20 |
| | | | | 345/419 |
| 7,844,229 | B2 | 11/2010 | Gyorfi et al. | |
| 8,160,390 | B1* | 4/2012 | Sandrew | G06T 11/001 |
| | | | | 345/638 |
| 8,706,297 | B2* | 4/2014 | Letsky | A01D 34/008 |
| | | | | 700/245 |
| 8,839,121 | B2 | 9/2014 | Bertolami et al. | |
| 8,855,819 | B2 | 10/2014 | Choi et al. | |
| 8,933,931 | B2 | 1/2015 | Balan et al. | |
| 8,988,464 | B2 | 3/2015 | Kim et al. | |
| 9,304,003 | B1 | 4/2016 | Ashman et al. | |
| 2003/0007694 | A1* | 1/2003 | Lee | G06T 9/004 |
| | | | | 382/238 |
| 2004/0131278 | A1* | 7/2004 | Imagawa | G06T 11/60 |
| | | | | 382/284 |
| 2004/0145593 | A1* | 7/2004 | Berkner | G06F 17/30905 |
| | | | | 345/619 |
| 2005/0259882 | A1* | 11/2005 | Dewaele | G06T 7/75 |
| | | | | 382/243 |
| 2009/0198375 | A1* | 8/2009 | Kanayama | G05D 1/0221 |
| | | | | 700/245 |
| 2010/0158310 | A1* | 6/2010 | McQueen | G06K 9/00 |
| | | | | 382/100 |
| 2010/0199232 | A1* | 8/2010 | Mistry | G06F 1/163 |
| | | | | 715/863 |
| 2010/0238161 | A1* | 9/2010 | Varga | G06T 17/05 |
| | | | | 345/419 |
| 2011/0252320 | A1* | 10/2011 | Arrasvuori | G06F 1/1626 |
| | | | | 715/704 |
| 2012/0075343 | A1* | 3/2012 | Chen | G09G 5/397 |
| | | | | 345/633 |
| 2012/0189211 | A1* | 7/2012 | Luo | G06F 17/30247 |
| | | | | 382/218 |
| 2012/0249741 | A1* | 10/2012 | Maciocci | G06F 3/011 |
| | | | | 348/46 |
| 2012/0306865 | A1* | 12/2012 | Kwon | H04N 13/261 |
| | | | | 345/419 |
| 2013/0120405 | A1* | 5/2013 | Maloney | G06T 13/00 |
| | | | | 345/474 |
| 2013/0266292 | A1* | 10/2013 | Sandrew | H04N 9/79 |
| | | | | 386/282 |
| 2013/0307536 | A1* | 11/2013 | Feng | G01R 33/5608 |
| | | | | 324/309 |
| 2013/0342527 | A1* | 12/2013 | Molyneaux | G06T 7/0032 |
| | | | | 345/419 |
| 2014/0028673 | A1* | 1/2014 | Gregson | G06T 17/20 |
| | | | | 345/420 |
| 2014/0063005 | A1* | 3/2014 | Ahn | H04N 13/261 |
| | | | | 345/419 |
| 2014/0119598 | A1* | 5/2014 | Ramachandran | G06T 11/60 |
| | | | | 382/103 |
| 2014/0123507 | A1* | 5/2014 | Gupta | G01B 11/002 |
| | | | | 33/1 |
| 2014/0267234 | A1 | 9/2014 | Hook et al. | |
| 2014/0323148 | A1 | 10/2014 | Schmalstieg et al. | |
| 2014/0354685 | A1* | 12/2014 | Lazarow | G02B 27/0172 |
| | | | | 345/633 |
| 2015/0002546 | A1* | 1/2015 | Nakao | H04N 1/387 |
| | | | | 345/634 |
| 2015/0186745 | A1* | 7/2015 | Martini | G06T 7/0008 |
| | | | | 345/633 |
| 2015/0302655 | A1* | 10/2015 | Miller | G06F 3/011 |
| | | | | 345/633 |
| 2015/0304634 | A1* | 10/2015 | Karvounis | H04N 13/239 |
| | | | | 348/46 |
| 2015/0332489 | A1* | 11/2015 | Birchfield | G06T 11/206 |
| | | | | 345/440 |
| 2016/0026253 | A1* | 1/2016 | Bradski | G02B 27/225 |
| | | | | 345/8 |
| 2016/0048263 | A1* | 2/2016 | Hiraga | G06F 3/04883 |
| | | | | 345/173 |
| 2016/0071315 | A1* | 3/2016 | Cohen | G06T 15/30 |
| | | | | 345/419 |
| 2016/0148433 | A1* | 5/2016 | Petrovskaya | G06T 19/006 |
| | | | | 345/633 |
| 2016/0240001 | A1* | 8/2016 | Sheffer | G06T 17/20 |
| 2017/0031953 | A1* | 2/2017 | Tang | G06N 7/005 |
| 2017/0039764 | A1* | 2/2017 | Hu | G08G 5/0013 |
| 2017/0084001 | A1* | 3/2017 | Holzer | G06T 11/60 |
| 2017/0329503 | A1* | 11/2017 | Tilton | G06F 3/017 |
| 2018/0149753 | A1* | 5/2018 | Shin | G01S 17/89 |

OTHER PUBLICATIONS

"Project Tango Developer Overview", Published on: Sep. 9, 2015 Available at: https://developers.google.com/project-tango-developer-overview.

Davison, Andrew J., "Real-Time Simultaneous Localisation and Mapping with a Single Camera", In Proceedings of 9th IEEE International Conference on Computer Vision, Oct. 14, 2003, pp. 1-8.

Lategahn, et al., "Vision Only Localization", In Proceedings of Ieee Transactions on Intelligent Transportation Systems, vol. 15, Issue 3, Jun. 2014, pp. 1-12.

Pietzsch, Tobias, "Towards Dense Visual SLAM", In Doctoral Dissertation of Technical University Dresden, Dec. 5, 2011, 268 pages.

Fleck, et al., "[POSTER] Tracking and Mapping with a Swarm of Heterogeneous Clients", In Proceedings of IEEE International Symposium on Mixed and Augmented Reality, Sep. 29, 2015, pp. 136-139.

Donovan, Jay, "Metaio's New SDK Allows SLAM Mapping From 1,000 Feet", Published on: Oct. 18, 2012 Available at: http://techcrunch.com/2012/10/18/metaios-new-sdk-allows-slam-mapping-from-1000-feet/.

Bergasa, et al: "Real-Time Hierarchical Outdoor SLAM Based on Stereovision and GPS Fusion", IEEE Transactions on Intelligent Transportation Systems, vol. 10, No. 3, Published Sep. 1, 2009, pp. 440-452.

Grisetti, et al: "A Tutorial on Graph-Based SLAM", IEEE Intelligent Transportation Systems Magazine, vol. 2, No. 4, Published Jan. 1, 2010, pp. 31-43.

International Search Report and the Written Opinion issued in PCT Application No. PCT/US2017/032992 dated Aug. 30, 2017.

"Non Final Office Action Issued in U.S. Appl. No. 15/786,266", dated Jan. 4, 2018, 7 Pages.

"Final Office Action Issued in U.S. Appl. No. 15/786,266", dated Jun. 28, 2018, 7 Pages.

* cited by examiner

SYSTEMS AND METHODS FOR UTILIZING ANCHOR GRAPHS IN MIXED REALITY ENVIRONMENTS

BACKGROUND

Mixed-reality computer systems have recently received significant interest for their ability to create immersive experiences for users. Mixed-reality systems include virtual reality, augmented reality, and other systems that incorporate virtual elements into a real-world environment.

One particular interest in mixed-reality applications is the ability for multiple users to have common shared experiences within a shared mixed-reality worldspace. For example, a first user may create a mixed-reality element that is accessed and viewed by others that are navigating through the shared worldspace. However, several technical challenges and obstacles have to be addressed to allow a seamless shared experience. For example, the respective mixed-reality systems need to establish some form of common coordinates. The recent emergence of mixed-reality applications for mobile computing devices has, at least in part, been enabled by advances in Simultaneous Location and Mapping ("SLAM") tracking systems and the broad availability of mobile depth camera modules. Convincing and seamless experiences in a shared mixed-reality worldspace can be accomplished by sharing accurately registered SLAM coordinate systems between client devices.

Sharing SLAM coordinate systems with large mixed-reality worldspaces can be memory and processor intensive. For example, sharing large numbers of key frames between different devices often involves sending the same large amounts of data to and from multiple devices. Transmitting such large amounts of data can lead to both network performance issues due to constrained bandwidth and memory issues at each user device. Accordingly, there is a need for improved shared SLAM coordinate systems that are bandwidth and memory efficient.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein comprise systems, methods, and apparatuses configured to efficiently utilize both network bandwidth and device storage within shared mixed-reality coordinate systems. In particular, disclosed embodiments comprise mixed-reality devices and mixed-reality server systems for generating anchor vertexes that comprise one or more key frames, a mixed-reality element, and at least one transform connecting the one or more key frames to the mixed-reality element. Additionally, the mixed-reality devices and mixed-reality server systems are configured to generate an anchor edge that comprises a transform between a first anchor vertex and a second anchor vertex. The various anchor vertexes and anchor edges are stored by the mixed-reality server systems and provided, as needed, to user devices.

Disclosed embodiments include computer systems for generating an anchor graph for a mixed-reality environment. The systems comprise one or more processors and one or more computer-readable media having stored computer-executable instructions that are executable by the one or more processors to configure the computer system to perform various acts. For example, the executable instructions are operable to configure the one or more processors to identify a first anchor vertex that includes a first set of one or more key frames, a first mixed-reality element, and at least one first transform connecting at least one key frame of the first set of the one or more key frames to the first mixed-reality element.

The executable instructions are also operable to configure the one or more processors to identify a second anchor vertex that includes a second set of one or more key frames, a second mixed-reality element, and at least one second transform connecting at least one key frame of the second set of the one or more key frames to the second mixed-reality element. Additionally, the executable instructions are further operable to configure the one or more processors to create a first anchor edge between the first anchor vertex and the second anchor vertex and to configure the one or more processors to save the first anchor vertex, the second anchor vertex, and the anchor edge within an anchor graph data structure.

Additional disclosed embodiments include methods for using an anchor graph within a mixed-reality environment. These methods include acts for identifying a first device with a stored first anchor graph and for detecting when the first device is within a predetermined proximity to a first physical location. Then, in response to detecting that the first device is within the predetermined proximity, a first anchor vertex and a first anchor edge are transmitted to the first device. The first anchor vertex comprises at least one first key frame, a first mixed-reality element, and at least one first transform connecting the at least one first key frame to the first mixed-reality element. The first anchor edge comprises a transformation connecting the first anchor vertex to another anchor vertex.

Further disclosed embodiments include methods for using an anchor graph within a mixed-reality environment. These methods include a first user device communicating, to a server, location data associated with a location of the first user device. The first user device then receives, in response to the communication, a first anchor vertex that is within a predetermined proximity to the first device and a first anchor edge. The first anchor vertex includes at least one first key frame, a first mixed-reality element, and at least one first transform connecting the at least one first key frame to the first mixed-reality element. The first anchor edge comprises a transformation connecting the first anchor vertex to another anchor vertex.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments include systems, methods, and apparatuses that are configured to optimize the sharing of SLAM coordinate systems. In particular, disclosed embodiments improve network bandwidth consumption between different portions of a mixed-reality system. Additionally, disclosed embodiments dramatically reduce the amount of storage required to utilize shared SLAM coordinate systems.

Some disclosed embodiments provide significant technical improvements to the field of mixed-reality computer systems for sharing coordinate systems and for referencing objects within a mixed-reality environment. The disclosed systems are capable of providing significant reductions in the quantity of data that must be transmitted and stored for enabling the shared use of a mixed-reality environment. For instance, rather than storing and transmitting a complete mapping of all elements in the shared environment to all systems, it is possible to transmit and share only relevant data that is sufficient to identify relative locations of the different systems/components within the shared environment. This may be accomplished, in some instances, by creating and using anchor vertexes and establishing/identifying transforms between those anchor vertexes.

For example, some embodiments comprise mixed-reality devices and mixed-reality server systems for generating anchor vertexes that comprise one or more key frames, a mixed-reality element, and at least one transform connecting the one or more key frames to the mixed-reality element. Additionally, the mixed-reality devices and mixed-reality server systems also generate an anchor edges that comprise transforms between different anchor vertexes. The various anchor vertexes and anchor edges are stored by the mixed-reality server system and provided, as needed, to user devices.

Figure 1:
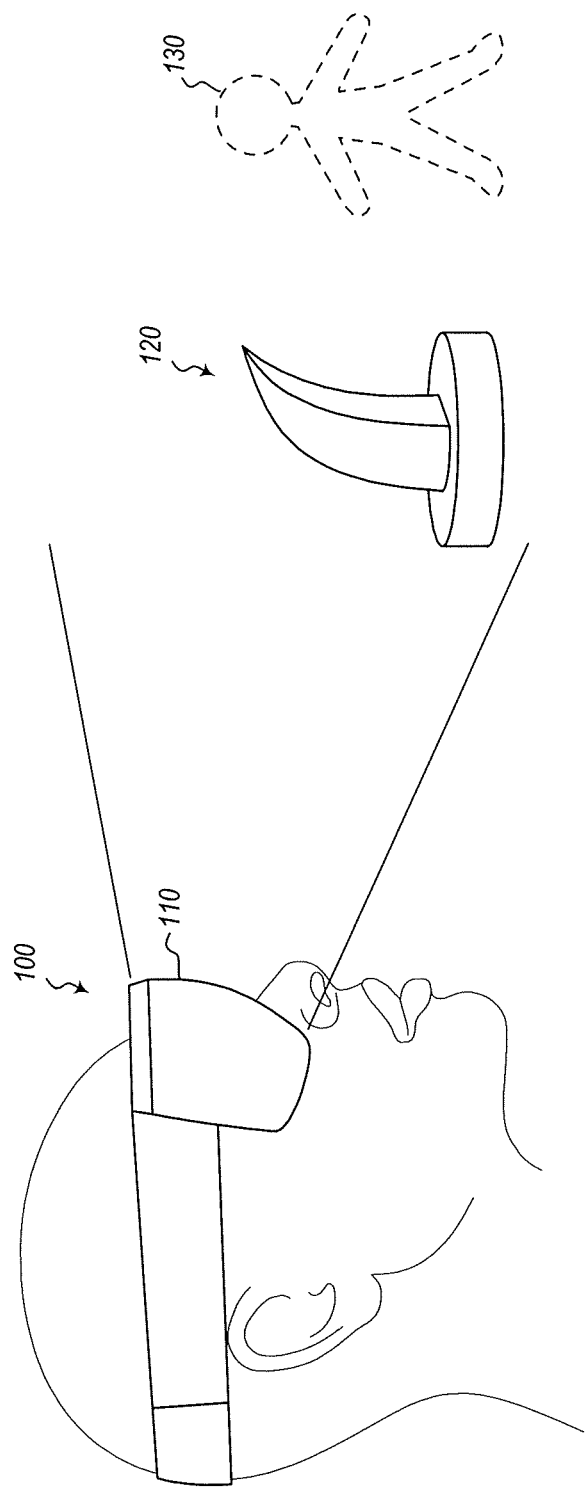
FIG. 1 illustrates a perspective view of a user viewing a sculpture through an embodiment of a mixed-reality headset.

Turning now to the figures, FIG. 1 illustrates a perspective view of a user 100 viewing a sculpture 120 through an embodiment of a mixed-reality headset 110 (also referred to herein as a "mixed-reality device"). The mixed-reality headset 110 may comprise various sensors, displays, processors, storage devices, network interfaces, and other similar computer components. The mixed-reality headset 110 is capable of tracking the user's surroundings and displaying three-dimensional images that overlay the real-world environment of the user 100. One will understand that there are numerous different embodiments of mixed-reality devices, such as the depicted mixed-reality headset 110, that can equivalently be used within the embodiments disclosed herein. In this regard, the depicted mixed-reality headset 110 should not be viewed as limiting the scope of this disclosure, but merely one form of an exemplary system that is provided for the sake of clarity and explanation.

In FIG. 1, the user 100 is depicted as viewing a sculpture 120 through the mixed-reality headset 110. The user 100 is also viewing a mixed-reality element 130 that is rendered by the mixed-reality headset 110. In the depicted embodiment, the mixed-reality element 130 comprises a hologram of an art expert that is programmed to provide information about the sculpture 120. In alternate embodiments, however, the mixed-reality element 130 is composed of a plurality of different computer-generated objects/components including, but not limited to, two-dimensional video, text information, two-dimensional images, audio data, interactive user interfaces, and any number of other equivalent and known computer generated user interface objects within mixed-reality systems. As such, while the present disclosure primarily describes mixed-reality elements, such as the hologram of element 130, one will understand that mixed-reality elements within the scope of this disclosure can comprise any number and type of different augmented and virtual reality objects/content.

Figure 2:
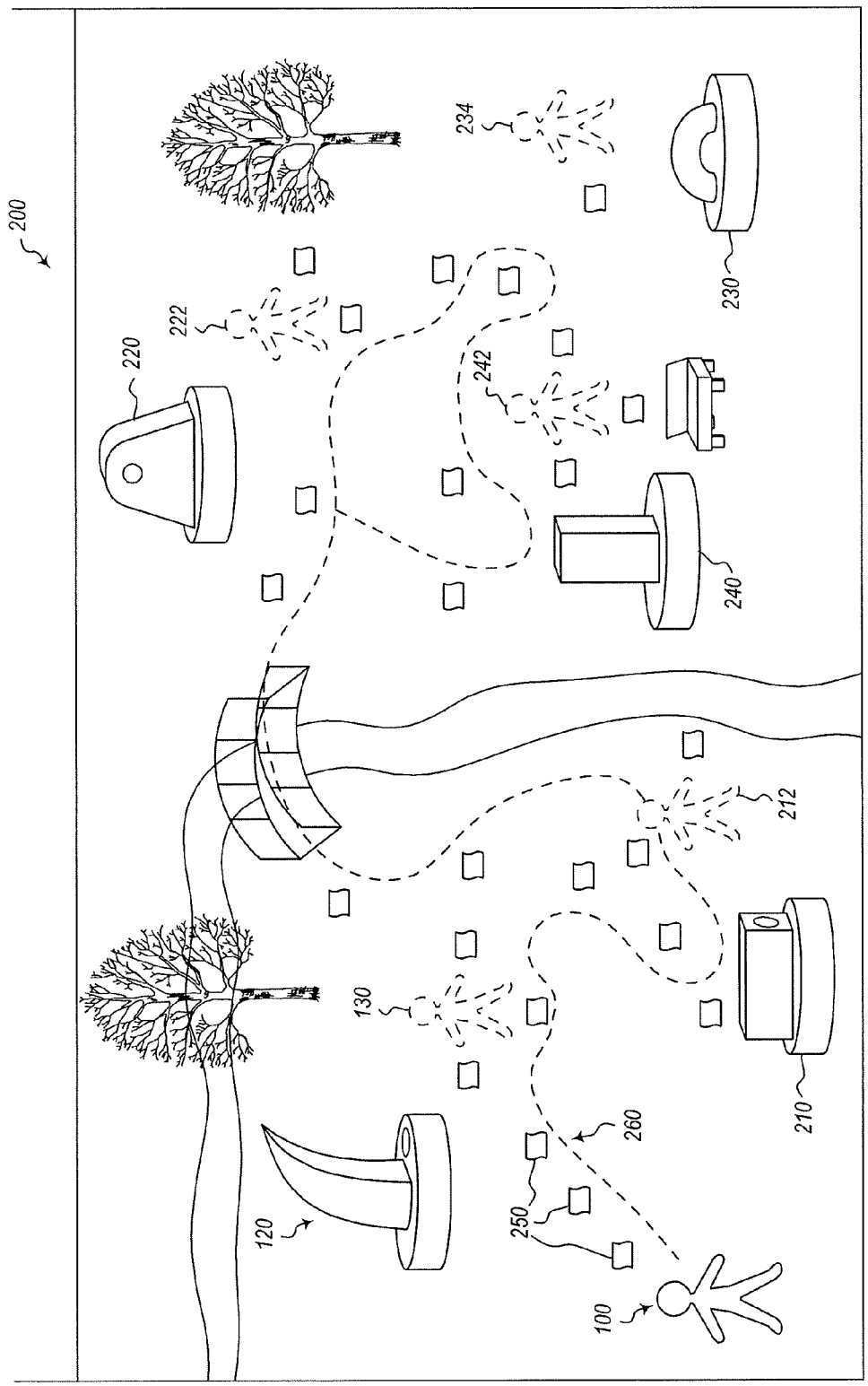
FIG. 2 illustrates a map of a user's pathway through a sculpture park while wearing an embodiment of a mixed-reality headset.

FIG. 2 illustrates a map 200 of a user's pathway 260 through a sculpture park while wearing a mixed-reality headset 110 (shown in FIG. 1). The depicted sculpture park comprises a number of different sculptures 210, 220, 230, 240, including sculpture 120 from FIG. 1. Additionally, the map 200 depicts various key frames 250 that are generated by the mixed-reality headset 110 as the user 100 walks along the user's pathway 260. As used herein, key frames 250 comprise visual samples that the mixed-reality headset 110 gathers from an environment to establish a coordinate frame. For example, the key frames 250 may comprise image data and geolocation data that is received and processed by a camera within the mixed-reality headset 110 as the user 100 walks along the pathway 260.

Tracing the user's pathway 260 through the sculpture park, FIG. 2 illustrates that the user 100 first walks to sculpture 120 where a first mixed-reality element 130 is displayed. The user 100 then continues along the pathway 260 to sculpture 210 where a second mixed-reality element 212 is displayed to the user. The user's pathway 260 then progresses to sculpture 220 and an associated third mixed-reality element 220. The user 100 then travels to sculpture 230 where an associated fourth mixed-reality element 232 is displayed. The user's pathway 260 continues to sculpture 240 and an associated fifth mixed-reality element 242. Finally, the user 100 returns to sculpture 220 and a sixth mixed-reality element 222.

In at least one embodiment, the user 100 is capable of generating mixed-reality element (e.g., 222) that is associated with a particular sculpture (e.g., 220). For example, the user 100 may have access to a pre-made hologram of an art expert describing sculpture 220. In an alternative embodiment, the user 100 may create a wholly new hologram describing sculpture 220. In any case, the user 100 provides a mixed-reality element 222 that is associated with sculpture 220. In at least one embodiment, the user 100 also determines the physical location of the mixed-reality element 222 with respect to the sculpture 220. This information can be entered into system 110 and/or into a connected server system.

Using methods that will be described more fully herein, a second user (not shown) may at a future time also approach sculpture 220. If the second user is wearing a mixed-reality headset 110, the mixed-reality element 220 that was created by user 100 can be displayed to the second user (as provided through system 110 or the connected server system, based on the positioning of the second user). As such, a user is capable of both generating mixed-reality elements and receiving mixed-reality elements that were generated by others.

Figure 3:
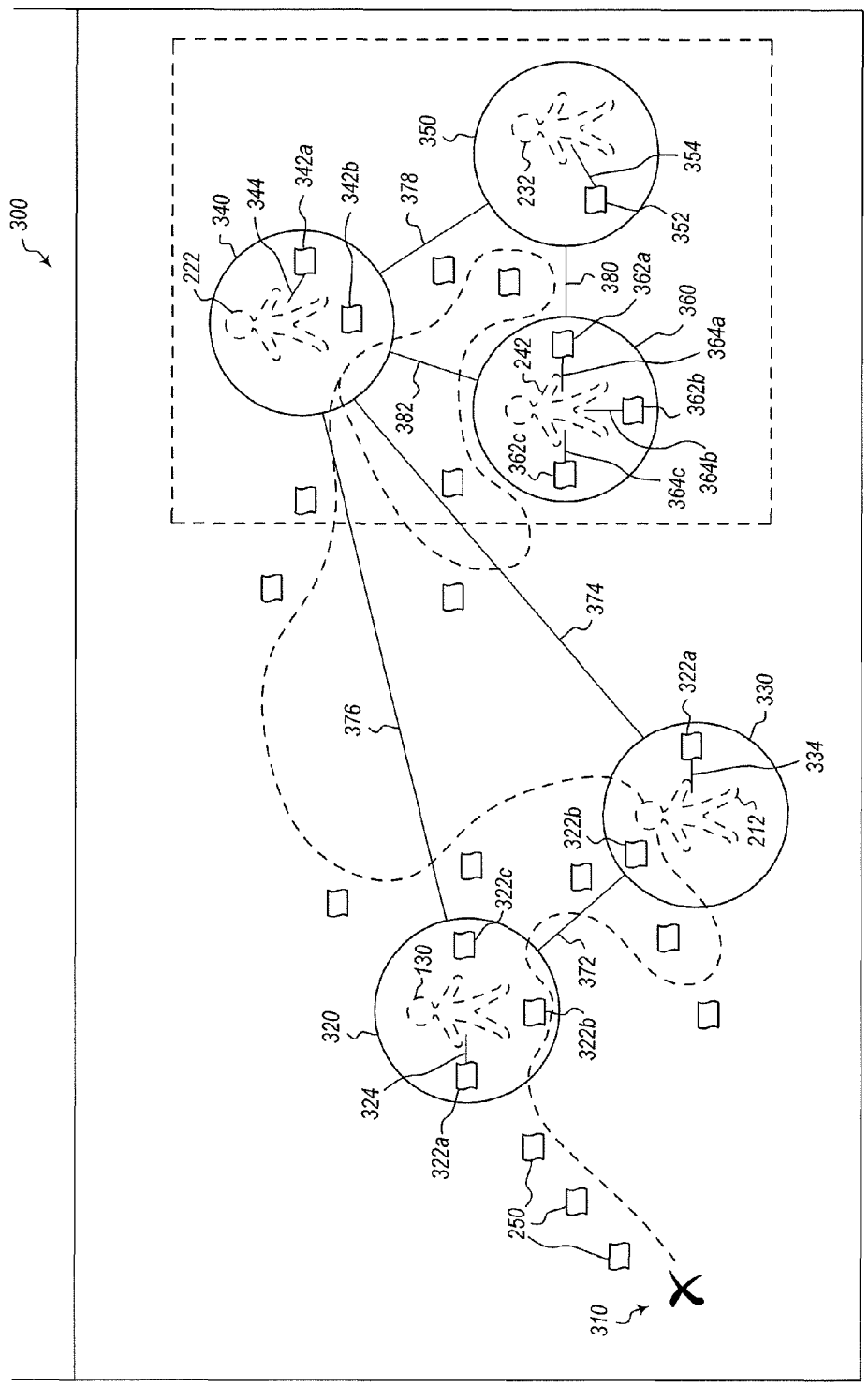
FIG. 3 illustrates an embodiment of an anchor map of a user's pathway through the sculpture park of FIG. 2.

FIG. 3 illustrates an anchor map 300 corresponding to the user's traversed pathway 260 through the sculpture park of FIG. 2, starting from location 310. FIG. 3 also depicts the key frames 250, mixed-reality elements 130, 212, 222, 232, 242, and various other anchor map elements proximate the user's pathway 260.

As used herein, an anchor map 300 comprises digital data that maps mixed-reality elements (e.g., 130) to locations within the real world. The anchor map 300 depicted in FIG. 3 is merely exemplary and is simply being provided for the sake of discussion. One of skill in the art will understand that in practice an anchor map comprises a different form, function, and structure than the visual anchor map 300 that is currently depicted.

In addition to the elements depicted within the map 200 of FIG. 2, the anchor map 300 also depicts a first anchor vertex 320, a second anchor vertex 330, a third anchor vertex 340, a fourth anchor vertex 350, and a fifth anchor vertex 360. Each anchor vertex comprises a first set of one or more key frames (e.g., key frames 322a, 322b, 322c), a mixed-reality element (e.g., mixed-reality element 130), and at least one transform (e.g., transform 324) connecting at least one key frame (e.g., key frame 322a) to the mixed-reality element (e.g., mixed-reality element 130).

As used herein, a transform comprises a mathematical relationship between a location and viewing direction of the key frame and the location and pose of the mixed-reality element. The mathematical relationship may be a SE3 transformation (i.e., 3D rotation and translation) transform or other transform capable of providing relative location and position of objects. The transform may be based on any location referencing scheme, including vector relationships, spatial coordinates, rotational and/or translational matrices, and so forth.

The mixed-reality headset 110 uses the transform and its associated key frame to determine the correct location and pose to render a mixed-reality element with respect to the location of the associated key frame. The rendering of the mixed-reality element may be performed with any augmented reality or virtual reality technology that is known, wherein the relative positioning and pose of the rendered element is based on the techniques described within this disclosure, based at least in part on the determined anchor vertexes and connecting transforms.

Each anchor vertex (e.g., first anchor vertex 320) is associated with at least one anchor edge (e.g., first anchor edge 372) that connects the anchor vertex to another anchor vertex. As used herein, an anchor edge comprises a direct mathematical transform that maps the relative location of a first anchor vertex (e.g., 320) to the relative location of a second anchor vertex (e.g., 330). In at least one embodiment, an anchor edge also omits key frames 250 that are known to exist along the pathways between two respective anchor vertexes or other map locations near the anchor vertexes. In particular, the anchor edges represent transformations which may have been initially estimated by analysis of co-visible key frames, but are encoding the total transformation between anchors without requiring the transmission of individual key frames and pose-links (transforms) between the same. In this regard, the anchor edge comprises a composition or replacement of many intervening transforms. By omitting the key frames, it is possible to significantly reduce the data that needs to be stored/processed to identify a relative location within a mixed-reality environment. This is a significant change and improvement over known systems that map/reference all key frames traversed between different locations in a virtual environment.

Additionally, in at least one embodiment, an anchor edge comprises a rotational and/or translational matrix that represents the physical rotation and translation between two different anchor vertexes. Further, an anchor edge can comprise an SE(3) transform between a source and a target anchor vertex, a three-dimensional vector, or any other mathematical construct that is capable of describing a pathway between two objects located within a physical space.

Upon identifying the location of a first anchor vertex 320, the mixed-reality headset 110 uses the first anchor edge 372 to correctly determine the location of the second anchor vertex 330 (and its associated mixed-reality element 212).

In at least one embodiment, as the user 100 walks along the pathway 260, the mixed-reality headset 110 identifies a first anchor vertex 320. The first anchor vertex includes a first set of one or more key frames 322(a-c), a first mixed-reality element 130, and at least one first transform connecting at least one key frame 322a to the first mixed-reality element 130. Additionally, as the user continues along the pathway 260, the mixed-reality headset 110 identifies a second anchor vertex 330. The second anchor vertex 330 also includes a second set of one or more key frames 332(a, b), a second mixed-reality element 212, and at least one transform 334 connecting at least one key frame 332a to the second mixed-reality elements 212.

Upon identifying the first anchor vertex 320 and the second anchor vertex 330, the mixed-reality headset 110 creates a first anchor edge 372 between the first anchor vertex 320 and the second anchor vertex 330. In at least one embodiment, the mixed-reality headset 110 is then capable of saving the first anchor vertex 320, the second anchor vertex 330, and the first anchor edge 372 within an anchor graph data structure. In various embodiments, the anchor graph data structure may be stored within local memory in the mixed-reality headset 110, within remote memory on a remote server, or within a combination thereof. As used herein, identifying an anchor vertex can comprise receiving an anchor vertex from a remote server and/or creating an anchor vertex.

Continuing the example above, in at least one embodiment, the user 100 continues along the pathway 260 to a third sculpture 220 (shown in FIG. 2) that is associated with a third anchor vertex 340. The third anchor vertex 340 is associated with mixed-reality element 222, key frames 342 (*a, b*), and transform 344. Upon identifying the third anchor vertex 340, the mixed-reality headset 110 can create a second anchor edge 374 between the second anchor vertex 330 and the third anchor vertex 340.

As depicted in FIGS. 2 and 3, the second anchor vertex 374 substantially aligns with a pathway 260 that the user 100 walked between the second anchor vertex 330 and the third anchor vertex 340. Creating an anchor edge (e.g., 374) comprises calculating a direct mathematical transformation between two anchor vertexes. In at least one embodiment, the mixed-reality headset 110 calculates the mathematical transformation by calculating rotational and/or translational matrices based upon data gathered by the mixed-reality headset 110. For example, the mixed-reality headset 110 may comprise sensors such as accelerometers, gyroscopes, depth cameras, vision sensors, magnetometers, GPS units, and other similar navigational and positional sensors—one or more of which can be utilized to generate key frames 250. As such, in at least one embodiment, the mixed-reality headset 110 calculates an anchor edge by calculating rotational and/or translational matrices that link two anchor vertexes based upon the received sensor data, such as key frames 250.

After creating the second anchor edge 374, the mixed-reality headset 110 creates a third anchor edge 376 between the first anchor vertex 320 and the third anchor vertex 340. Of note, the user 100 never walked directly from the first anchor vertex 320 to the third anchor vertex 340. In this case, instead of generating the third anchor edge 376 based upon sensor data that the mixed-reality headset 110 gathered as the user 100 walked between the first anchor vertex 320 and the third anchor vertex 340, the mixed-reality headset 110 generates the third anchor edge 376 by combining the first anchor edge 372 and the second anchor edge 374. For example, combining the first anchor edge 372 and the second anchor edge 374 may comprise adding together the respective rotational and translational matrices that are associated with the first anchor edge 372 and the second anchor edge 374. Similarly, instead of directly combining the first anchor edge 372 and the second anchor edge 374, the mixed-reality headset 110 can generate the third anchor edge 376 by generating rotational and translational matrices based upon the various sensor readings (e.g., key frames 250) gathered along the user's pathway 260 from the first anchor vertex 320 to the second anchor vertex 330 and then on to the third anchor vertex 340. As such, in at least one embodiment, the mixed-reality headset 110 is capable of creating an anchor edge between any two anchor vertexes within an anchor graph by combining intermediate anchor vertexes or intermediate sensor readings together.

In at least one embodiment, identifying an anchor vertex comprises creating an anchor vertex. For example, user 100, using methods described above, may create mixed-reality element 130 that is associated with sculpture 120. After creating mixed-reality element 130, the mixed-reality headset 110 automatically calculates a transform 324 that associates at least one key frame 322a with the mixed-reality element 130. In at least one embodiment, a transform 324 between a key frame 322a and a mixed-reality element 130 comprises translational and rotational matrices that orient the mixed-reality element 130 with respect to the key frame 322A. Additionally, in at least one embodiment, the transform is based upon an interpolation of a coordinate location associated with the mixed-reality element 130, which coordinate location is derived from coordinates associated with each of the one or more key frames (e.g., 362(a-c). For example, in anchor vertex 360, multiple transforms 364(a-c) are depicted as relating the location of the mixed-reality element 242 to multiple key frames 362(a-c). As such, in at least one embodiment, a location of a mixed-reality element can be derived from coordinate systems associated with multiple key frames 362(a-c).

After calculating the transform 324, the mixed-reality headset 110 creates the first anchor vertex 320 by creating a data structure that contains a reference to the mixed-reality element 130, the transform 324, the associated key frame 322a, and various other key frames 322(b, c) that are also proximate to the location of the mixed-reality element 130.

In at least one embodiment, the number of key frames 322(a-c) associated with a particular anchor vertex is determined by a pre-defined memory size cap for anchor vertexes. For example, a mixed-reality headset 110 may limit the size of any given anchor vertex to 10 MB, 15 MB, 20 MB or any other predetermined size. As such, the mixed-reality headset 110 only includes a restricted number of key frames to a predetermined number of key frames (e.g., less than 2, less than 3, less than 5, or another quantity) and/or to a predetermined storage size that will maintain a total memory size of the anchor vertex (e.g., less than or equal to about 10 MB). This may include omitting key frames, as previously discussed. In various embodiments, capping the memory size of anchor vertexes allows a mixed-reality system to operate within optimized bandwidth and memory parameters. For example, whether creating and uploading an anchor vertex or receiving an anchor vertex from a remote server, the mixed-reality headset 110 only needs to store and/or communicate data files that are limited to a predetermined size (e.g., 10 MB).

Figure 5:
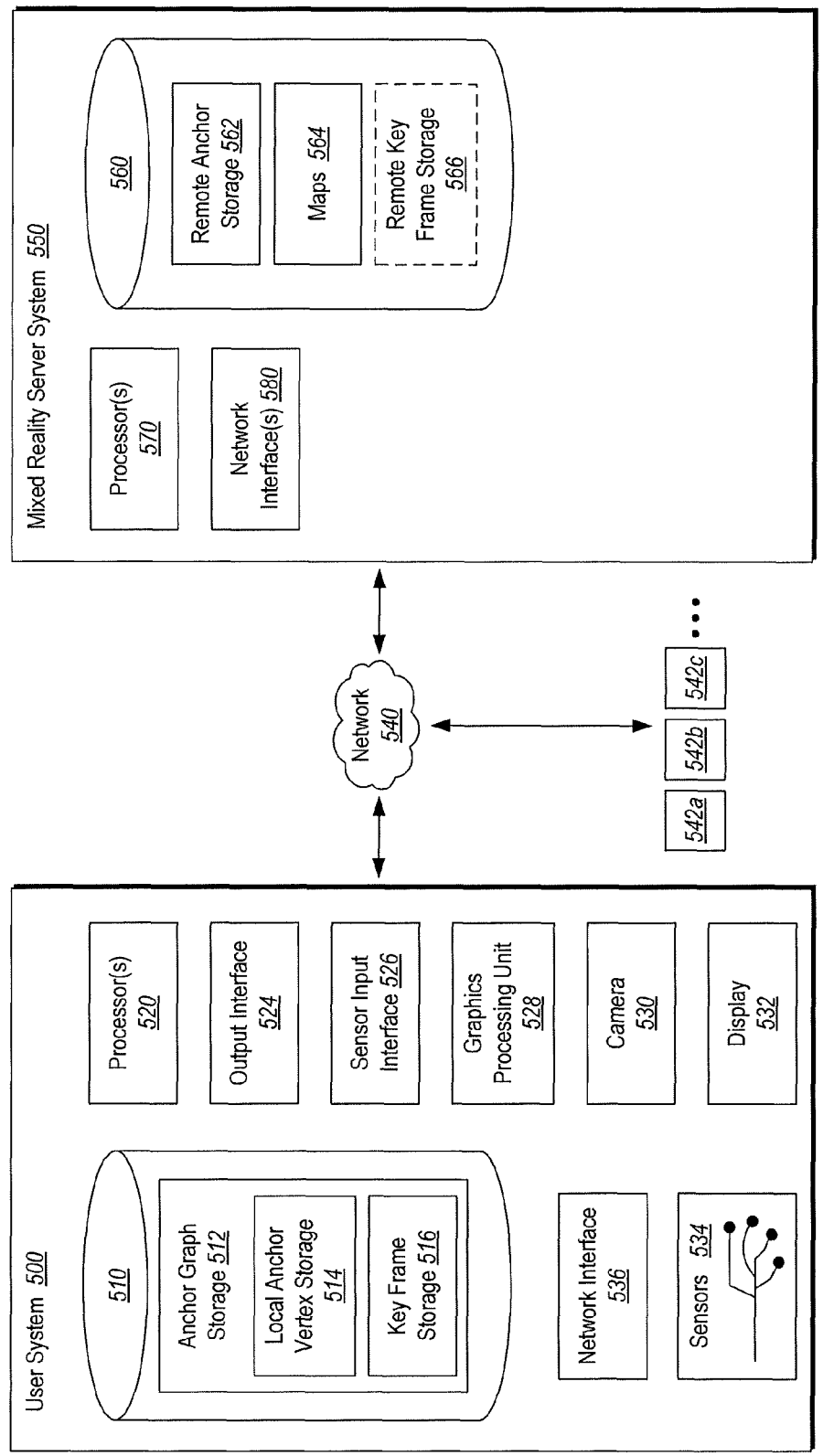
FIG. 5 illustrates a schematic view of an embodiment of a mixed-reality system.

In addition to the various methods described above for creating anchor vertexes, in at least one embodiment, the mixed-reality device 110 receives anchor vertexes from a mixed-reality server system (shown as 550 in FIG. 5). For example, in at least one embodiment, the mixed-reality headset 110 communicates data to the mixed-reality server system 550. Using the data received from the mixed-reality device 110, the mixed-reality server system 550 identifies that the mixed-reality device 110 comprises a stored anchor graph. In at least one embodiment, the mixed-reality server system 550 receives an index of anchor vertexes stored within the anchor graph on the mixed-reality device 110. Using the index, the mixed-reality server system 550 determines what additional anchor vertexes to send to the mixed-reality device 110 and that are related to the stored anchor vertexes (e.g., related by location or context). The system 550 may also create transforms between the stored and new vertexes that are being sent to the user device 110. Alternatively, the user device 110 may create the transforms.

In some embodiments, the mixed-reality server system 550 triggers the transmission of vertexes to the user device in response to detecting the mixed-reality device 110 is within a predetermined proximity to a first physical location. The detection of the device 110 location can be based on sensors in the device 100 and other systems proximate the first location. Alternatively, the location can be extrapolated from mapping traversal of the user's path 260. In yet other embodiments, the location is determined by location information entered by the user at the device 100 that specifies their location.

The first physical location may comprise the location of mixed-reality element 130, sculpture 120, first anchor vertex 320, or any other physical location otherwise associated with sculpture 120. In response to detecting that the mixed-reality device 110 is within the predetermined proximity, the mixed-reality server system 550 transmits the first anchor vertex 320 and the first anchor edge 372 to the mixed-reality device 110.

As described above, in at least one embodiment, the mixed-reality server system 550 is also configured to receive one or more anchor vertexes from the mixed-reality device 110, which may be subsequently stored at the server system 550 for use by one or more other user systems. For example, the user 100, in conjunction with the mixed-reality device 110, may create a new anchor vertex and its associated at least one new key frame, new mixed-reality element, and new transform 344 connecting the at least one new key frame to the new mixed-reality elements. Even more specifically, the mixed-reality device may create the third anchor vertex 340 and its associated at least one key frame 342(a, b), mixed-reality element 222, and transform 344 connecting the at least one key frame 342a to the mixed-reality elements 222.

After the mixed-reality device 110 creates the new anchor vertexes (e.g., the third anchor vertex 340), the mixed-reality server system 550 receives the new anchor vertex from the mixed-reality device 110. Additionally, the mixed-reality server system 550 also receives a physical location that is associated with the real-world physical location of the new anchor vertex and a new anchor edge that comprises a transformation between the first anchor vertex 320 and the new anchor vertex. For example, the mixed-reality server 550 may receive the third anchor vertex 340, the physical location associated with the third anchor vertex 340, and the third anchor edge 376 that links that third anchor vertex 340 to the first anchor edge 320.

When a second user (not shown) who has an associated second mixed-reality device (not shown) enters the sculpture park depicted in FIGS. 2 and 3, the mixed-reality server system 550 identifies that the second mixed-reality device is storing a second anchor graph. Additionally, the mixed-reality server system 550 detects that the second mixed-reality device is within a predetermined proximity to the physical location that is associated with the new anchor vertex (e.g., the third anchor vertex 340). In response to detecting that the second mixed-reality device is within the predetermined proximity to the physical location, the mixed-reality server system 550 transmits the third anchor vertex 340 and the third anchor edge 376 to the second mixed-reality device. Accordingly, the second mixed-reality device receives anchor vertexes and anchor edges that were identified by a separate user 100 and mixed-reality device 110. As such, in at least one embodiment, the mixed-reality server system 550 stores and transmits a plurality of anchor vertexes and associated anchor edges that are created by various different devices.

Figure 4A:
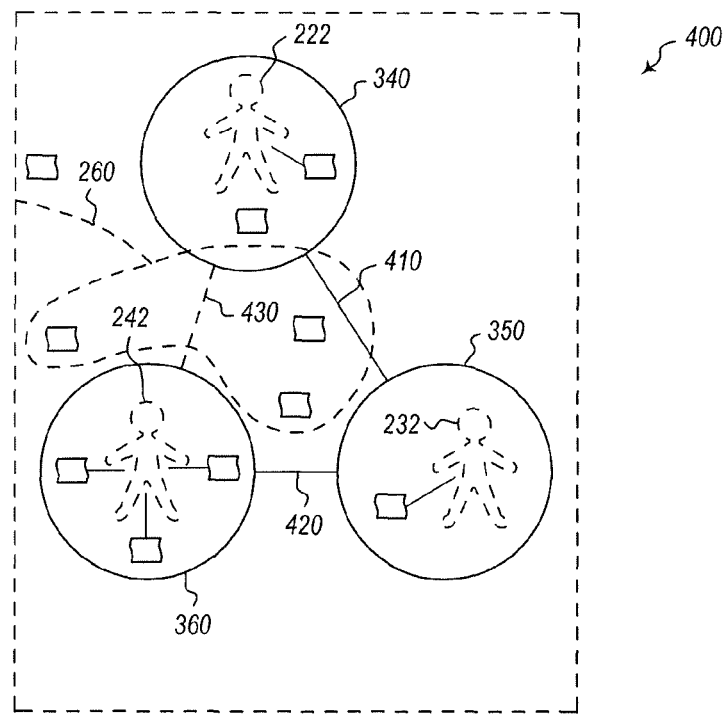
FIG. 4A illustrates an exploded view of the anchor map of FIG. 3.

Turning now to FIG. 4A, FIG. 4A illustrates an exploded view 400 of the anchor map 300 of FIG. 3. In particular, FIG. 4A depicts the user's pathway 260 in relation to the third anchor vertex 340, the fourth anchor vertex 350, and the fifth anchor vertex 360. The third anchor vertex 340 comprises mixed-reality element 222, the fourth anchor vertex 350 comprises mixed-reality element 232, and the fifth anchor vertex 360 comprises mixed-reality element 242. Additionally, the third anchor vertex 340 comprises key frames 342(a, b) that are linked to the mixed-reality element 222 through transform 344. Similarly, the fourth anchor vertex 350 comprises a single key frame 352a that is linked to the mixed-reality element 232 through transform 354. Further, the fifth anchor vertex 360 comprises key frames 362(a-c) that are each separately linked to the mixed-reality element 242 through transforms 364(a-c).

As described above, as the anchor vertexes 340, 350, 360 are identified, respective anchor edges 410, 420, 430 can be created by the mixed-reality headset 110. For example, anchor edge 410 and anchor edge 420 both primarily follow the user's pathway 260 between the third anchor vertex 340 and the fourth anchor vertex 350 and between the fourth anchor edge 350 and the fifth anchor edge 306, respectively. As such, using methods described above, the mixed-reality headset 110 can calculate anchor edge 410 and anchor edge 420 using sensor data gathered from the user's mixed-reality headset 110 as the user traveled from the third anchor vertex 340 to the fourth anchor vertex 350 and from the fourth anchor vertex 350 to the fifth anchor vertex 360.

Additionally, using methods described above, the mixed-reality headset 110 also creates a calculated anchor edge 430 that extends from the fifth anchor vertex 360 to the third anchor vertex 340. In particular, the mixed-reality headset 110 creates the calculated anchor edge 430 by combining anchor edge 410 and anchor edge 420.

Figure 4B:
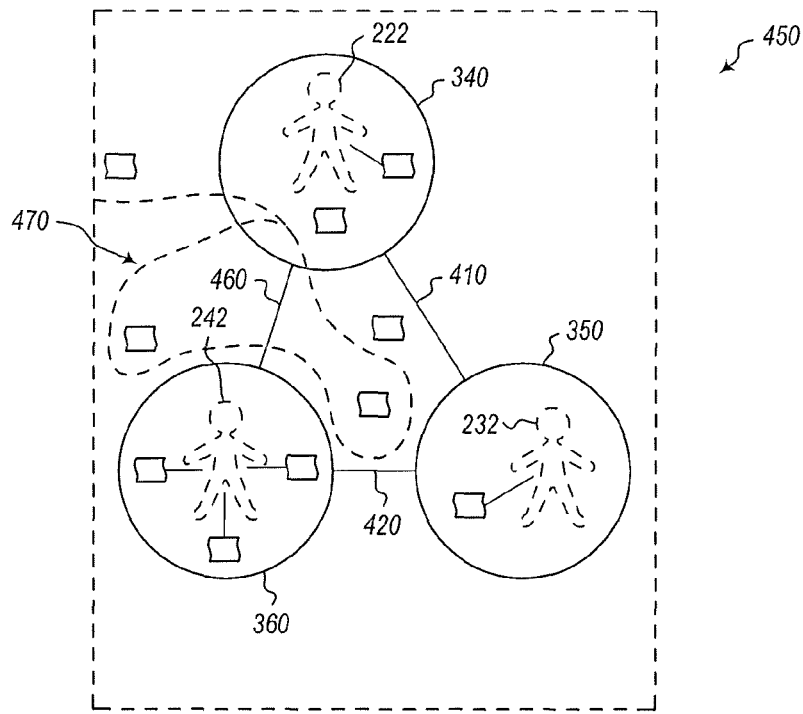
FIG. 4B illustrates another exploded view of the anchor map of FIG. 3.

In contrast, the mixed-reality headset 110 can create an anchor edge between the fifth anchor vertex 360 and the third anchor vertex 340 also using sensor data gathered from the user's mixed-reality headset 110 as the user 100 traveled from the fifth anchor vertex 360 to the third anchor vertex 340. For example, FIG. 4B illustrates another exploded view 450 of the anchor map 300 of FIG. 3. In the depicted embodiment, the mixed-reality headset 110 utilizes the user's pathway 470 between the fifth anchor vertex 360 and the third anchor vertex 340 to create a derived anchor edge 460. As such, in the depicted embodiment, the mixed-reality headset 110 has created a continuous loop of anchor vertexes and anchor edges between the third anchor vertex 340, the four anchor vertex 350, and the fifth anchor vertex 360.

In at least one embodiment after creating the loop, the mixed-reality headset 110 tunes one or more of the respective anchor edges 410, 420, 460. For example, as described above, in at least one embodiment the anchor edges comprise rotational and translational matrices. In an ideal case, mathematical relationships exist between the respective anchor edges within the loop. For instance, a combination of anchor edge 410 and anchor edge 420 should produce derived anchor edge 460. Using this mathematical relationship, the mixed-reality headset 110 can tune the respective anchor edges 410, 420, 460 based upon any discrepancies with the above stated mathematic relationship.

In at least one embodiment, when tuning the respective anchor edges 410, 420, 460, the mixed-reality headset 110 weights the accuracy of one or more of the anchor edges higher. For instance, anchor edge 410 and anchor edge 420 may have previously been tuned based upon data received from multiple different mixed-reality devices worn by multiple different users who traveled from the third anchor vertex 340 to the fourth anchor vertex 350 and from the fourth anchor vertex 350 to the fifth anchor vertex 360. In contrast, derived anchor edge 460 may only have data from a single mixed-reality device associated with a single user who walked pathway 470. In such a case, the mixed-reality device 110 tunes anchor edge 460 to conform with the mathematical relationship determined by a combination of anchor edge 410 and anchor edge 240. Accordingly, in various embodiments, the mixed-reality device 110 can tune various anchor edges over time such that greater accuracy is achieved as more anchor edges are added to an anchor graph and are validated by multiple users.

FIG. 5 illustrates a schematic view of an embodiment of a mixed-reality system. In particular, FIG. 5 illustrates a schematic view of a user system 500 in communication with a mixed-reality server system 550 through a network connection 540. The user system 500 may correspond with various hardware and software components within a mixed-reality device, such as mixed-reality headset 110. As depicted, the user system 500 comprises storage 510, processor(s) 520, output interface 524, sensory input interface 526, graphics processing unit 528, camera 530, display 532, and sensors 534. Storage 510 contains anchor graph storage 512, local anchor vertex storage 514, and key frame storage 516.

Mixed-reality server system 550 comprises storage 560, processor(s) 570, and network interfaces 580. Storage 560 contains remote anchor storage 562, maps 564, and in some additional or alternative embodiments remote key frame storage 566. The user system 500 and/or the mixed-reality server system 550 may be executed on various local, remote, and/or distributed systems 542(*a-c*) that communicate through network connection 540. One will understand that the various modules and components depicted in FIG. 5 are provided for the sake of example and that in various additional or alternative embodiments different combinations, descriptions, and depictions of modules and components can be equivalently used and described.

In at least one embodiment of user system 500, processor(s) 520 execute various software applications within the mixed-reality device 110. For example, the processor(s) 520 direct the graphics processing unit 528 to render a hologram and provide the hologram through the output interface 524 to a display 532 within the mixed-reality device. The processor(s) 520 also receive through the sensor input interface 526 sensor data from various sensors 534, including a camera 530.

As the processor(s) 520 identify anchor vertexes, the processor(s) 520 store the anchor vertexes within local anchor vertex storage 514. Similarly, as the mixed-reality device 110 generates key frames 250, the processor(s) 520 store the generated key frames 250 within key frame storage 516. As such, as the mixed-reality device 110 gathers and generates information related to the mixed-reality worldspace, the processor(s) 520 store the various SLAM coordinate data within anchor graph storage 512.

Additionally, the processor(s) 520 communicate information to the mixed-reality server system 550. For example, in at least one embodiment, the processor(s) 520 causes the network interface 536 to communicate one or more anchor vertexes to the mixed-reality server system 550.

The mixed-reality server system 550 receives the communicated anchor vertexes through network interface 580. Upon receiving an anchor vertex, the processor(s) 570 store the anchor vertex within remote anchor storage 562. Additionally, in at least one embodiment, the processor(s) 570 also store location data associated with a physical location of one or more anchor vertexes within maps 564. For example, the processor(s) 570 can store GPS coordinates associated with a particular anchor vertex within the maps 564.

In at least one additional or alternative embodiment, the processors 570 also store one or more received key frames 250 within remote key frame storage 566. For example, the processor(s) 570 may store some key frames 250 that are not associated with either an anchor vertex or an anchor edge. In contrast, in at least one embodiment, the mixed-reality server system 550 does not store any key frames 250, except those that are contained with anchor vertexes. Accordingly, in at least one embodiment, the mixed-reality server system 550 is only transmitting anchor vertexes to mixed-reality devices 110, and is not transmitting stand-alone key frames 250 that are not otherwise contained within an anchor vertex.

The form factor of the user system 500 and the mixed-reality server system 550 may vary to accommodate different needs and preferences. For instance, as described herein, the different systems may be standalone systems or distributed systems. The user system 500 may be configured as a head mounted display, another wearable or portable device, a vehicle, robot and/or autonomous system.

Figure 7:
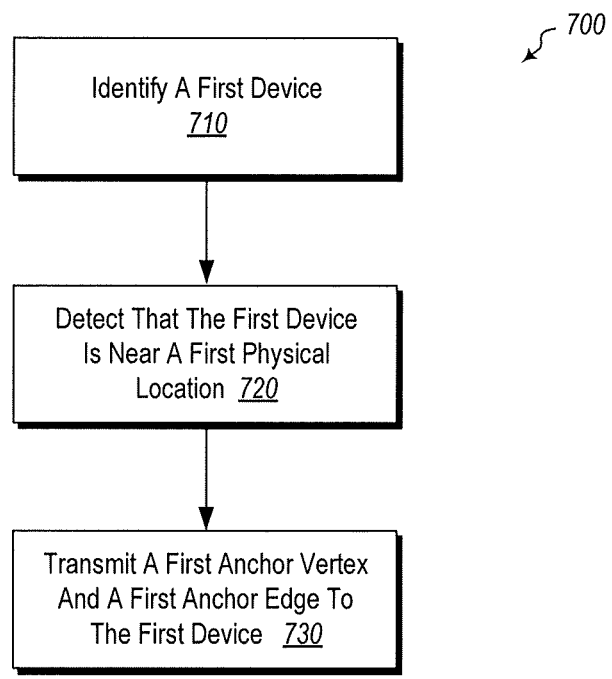
FIG. 7 illustrates a flowchart for an embodiment of a method for using an anchor graph within a mixed-reality environment.
Figure 8:
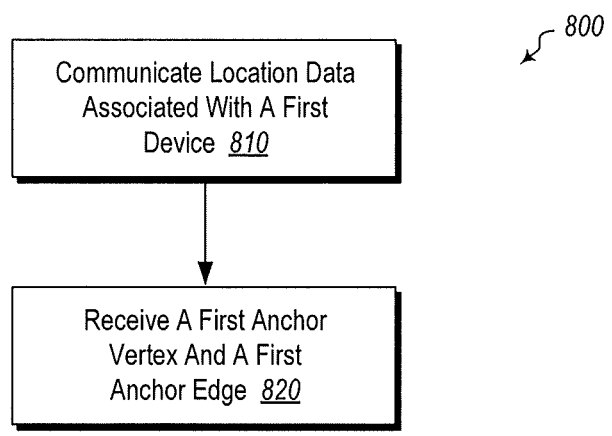
FIG. 8 illustrates a flowchart for another embodiment of a method for using an anchor graph within a mixed-reality environment.

One will appreciate that embodiments disclosed herein can also be described in terms of flowcharts comprising one or more acts for accomplishing a particular result. For example, FIGS. 6-8 and the corresponding text describe acts in various systems for performing methods and/or standalone methods for segmenting scenes into semantic components. The acts of FIGS. 6-8 are described below.

Figure 6:
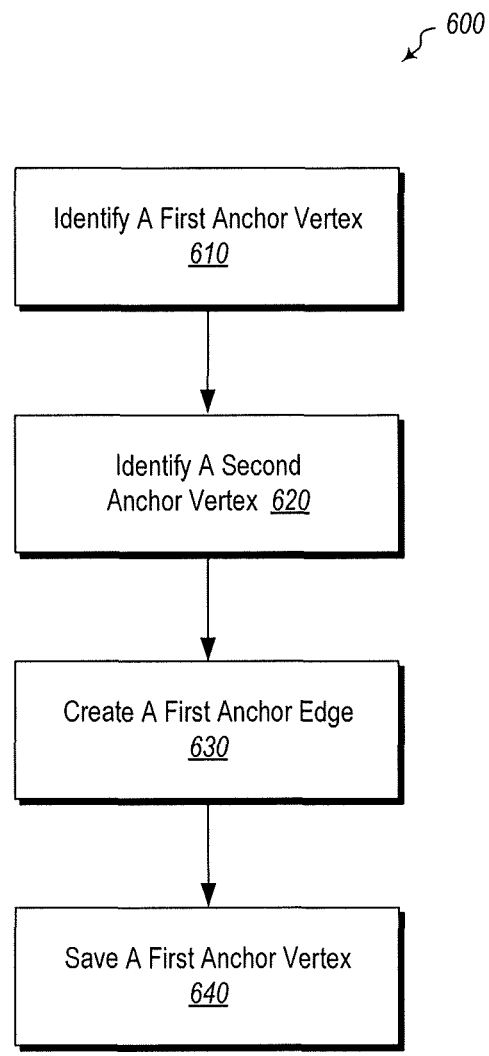
FIG. 6 illustrates a flowchart for an embodiment of a method for generating an anchor graph for a mixed-reality environment.

For example, FIG. 6 illustrates a flowchart 600 of acts associated with methods for generating an anchor graph for a mixed-reality environment. The illustrated acts comprise an act 610 of identifying a first anchor vertex that includes a first set of one or more key frames, a first mixed-reality element, and at least one first transform connecting at least one key frame of the first set of one or more key frames to the first mixed-reality element. For example, as depicted and described in FIGS. 2 and 3, a user 100 with a mixed-reality headset 110 can identify the first anchor vertex 320. Identifying the first anchor vertex 320 includes either creating the first anchor vertex 320 or receiving the first anchor vertex 320 from mixed-reality server system 550.

The next illustrated act, act 620, comprises identifying a second anchor vertex that includes a second set of one or more key frames, a second mixed-reality element, and at least one second transform connecting at least one key frame of the second set of the one or more key frames to the second mixed-reality element. For example, as depicted and described in FIGS. 2 and 3 and the accompanying description, a user 100 with a mixed-reality headset 110 can identify the second anchor vertex 330. Identifying the second anchor vertex 330 includes either creating the second anchor vertex 330 or receiving the second anchor vertex 320 from mixed-reality server system 550.

The next illustrated act, act 630, includes creating a first anchor edge between the first anchor vertex and the second anchor vertex. For example, as depicted and described in FIG. 3 and the accompanying description, a mixed-reality headset 110 calculates a first anchor vertex 372 in the form of a rotational matrix and/or a translational matrix that are derived from sensor data received as the user traveled from the first anchor vertex 320 to the second anchor vertex 330.

The next illustrated act, act 640, includes saving the first anchor vertex, the second anchor vertex, and the anchor edge within an anchor graph data structure. For example, as depicted and described in FIG. 5 and in the accompanying description, the user system 500 (i.e., the mixed-reality headset 110) stores anchor vertex data within an anchor graph storage 512. The anchor graph store 512 comprises various anchor graph storage structures such as, but not limited to, flat file data, relational data, linked data, and various other known data structures.

FIG. 7 illustrates a flowchart 700 of acts associated with related methods for using anchor graphs within mixed-reality environments. The first illustrated act, act 710, includes identifying a first device with a stored first anchor graph. For example, as depicted and described in FIGS. 2 and 5 and the accompanying description, the mixed-reality server system 550 identifies a mixed-reality device 110 that is associated with an anchor graph storage 512, which comprises a stored first anchor graph.

Next, act 720 includes detecting that the first device is near a first physical location, which may include determining the device is within a predetermined proximity to a first physical location. For example, as depicted and described in FIG. 3 and the accompanying description, the mixed-reality server system 550 identifies when a user 100 comes within a predetermined proximity to a physical location associated with the first anchor vector 320. The mixed-reality server system 550 identifies the relative location of the user 100 based upon information received from the mixed-reality user device 100 and information stored within maps 564.

Next, act 730 includes transmitting a first anchor vertex and a first anchor edge to the first device 730. This may be performed in response to detecting that the first device is within the predetermined proximity and may be performed by transmitting a first anchor vertex 320 and a first anchor edge 372 to the first device (e.g., mixed-reality headset 110), wherein the first anchor vertex comprises at least one first key frame, a first mixed-reality element, and at least one first transform connecting the at least one first key frame to the first mixed-reality element and wherein the first anchor edge comprises a transformation connecting the first anchor vertex to a second anchor vertex. For example, as depicted and described in FIGS. 3 and 5 and the accompanying description, the mixed-reality server system 550 can transmit an anchor vertex (e.g., first anchor vertex 320) and an anchor edge (e.g., first anchor edge 372) to a mixed-reality device 110.

FIG. 8 illustrates a flowchart 800 of acts associated with related methods for using an anchor graph within a mixed-reality environment. The first illustrated act, an act 810, includes communicating location data associated with a first device to a server. This location data is associated with a location of a first device. For example, as depicted and described in FIGS. 3 and 5 and the accompanying description, user system 500 (e.g., mixed-reality device 110) communicates through a network interface 536 to the mixed-reality server system 550 location data gathered from one or more sensors 534. Alternatively, the location may be entered by the user into the user device.

Next, the device receives (act 820) a first anchor vertex and a first anchor edge 820 in response to communicating the location data to the server. The first anchor vertex is a vertex that is determined to be within a predetermined proximity to the first device and a first anchor edge or that is otherwise related to a stored vertex at the user device. The first anchor vertex comprises at least one first key frame, a first mixed-reality element, and at least one first transform connecting the at least one first key frame to the first mixed-reality element. The first anchor edge comprises a transformation connecting the first anchor vertex to another anchor vertex (e.g., a stored vertex). For example, as depicted and described in FIGS. 3 and 5 and the accompanying description, when it is determined that a user 100 is within a predetermined proximity to a physical location associated with an anchor vertex, the mixed-reality server system 550 communicates the anchor vertex to the user device.

Based on the foregoing description, it will be appreciated that the disclosed embodiments provide systems, methods, and apparatuses for optimizing the sharing of sparse SLAM coordinates within a mixed-reality worldspace. As described herein, the use, storage, and transmission of anchor vertexes provide significant technical improvements to at least bandwidth consumption and storage space requirements within mixed-reality applications. The improved bandwidth and storage space requirements provides for significantly improved user experience within mixed-reality worldspaces because the use of the location vertexes provides less of a burden on network bandwidth and storage capacities.

Additionally, by using anchor vertexes that are linked together by anchor edges within an anchor graph map, it is possible to create a system of graphs within graphs. A "graph of graphs" representation enables sparse representation of SLAM data, which is locally dense in regions where shared mixed-reality content is displayed. Each anchor vertex represents a relatively small SLAM map component with tracking and relocalization data, and contains at least one associated world-fixed coordinate frame or "anchor" for displaying accurately registered mixed-reality content. Each anchor edge encodes relative pose between the coordinate system(s) represented by respective anchor vertexes. The physical size of the mapped environment becomes virtually unlimited via cloud-based storage of exported SLAM tracking data (i.e. "anchor vertexes").

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry out desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for generating an anchor graph for a mixed-reality environment, comprising:
one or more processors; and
one or more computer-readable media having stored thereon executable instructions that when executed by the one or more processors configure the computer system to perform at least the following:
identify a first anchor vertex, the first anchor vertex including: a first set of key frames, a first mixed-reality element, and at least one first transform connecting at least one key frame of the first set of key frames to the first mixed-reality element;
identify a second anchor vertex, the second anchor vertex including: a second set of key frames, a second mixed-reality element, and at least one second transform connecting at least one key frame of the second set of key frames to the second mixed-reality element;
create a first anchor edge between the first anchor vertex and the second anchor vertex wherein the first anchor edge omits one or more separate transforms between each of the key frames in the first anchor vertex and the second anchor vertex, and wherein the first anchor edge comprises a single transform that connects the first anchor vertex and the second anchor vertex; and
save the first anchor vertex, the second anchor vertex, and the anchor edge within an anchor graph data structure.

2. The computer system as recited in claim 1, wherein the executable instructions include instructions that when executed configure the computer system to:
identify a third anchor vertex, the third anchor vertex including: a third set of one or more key frames, a third mixed-reality element, and at least one third transform connecting at least one key frame of the third set of the one or more key frames to the third mixed-reality element;
create a second anchor edge between the second anchor vertex and the third anchor vertex; and
create a third anchor edge between the third anchor vertex and the first anchor vertex.

3. The computer system as recited in claim 2, wherein the executable instructions are configured, when executed, to cause the computer system to tune the first anchor edge based upon values associated with the third anchor edge.

4. The computer system as recited in claim 2, wherein:
the second anchor edge is created based upon one or more sensor readings gathered along a pathway that links the second anchor vertex and the third anchor vertex; and
the third anchor edge is created based upon a combination of the first anchor edge and the second anchor edge.

5. The computer system as recited in claim 2, wherein:
the second anchor edge is created based upon one or more sensor readings gathered along a pathway that links the second anchor vertex and the third anchor vertex; and
the third anchor edge is created based upon one or more key frames that link the first anchor edge and the second anchor edge.

6. The computer system as recited in claim 1, wherein creating the first anchor edge comprises calculating a direct transformation between the first anchor vertex and the second anchor vertex.

7. The computer system as recited in claim 6, wherein the first anchor edge omits key frames from the first set of key frames.

8. The computer system as recited in claim 1, wherein identifying a first anchor vertex comprises creating the first anchor vertex.

9. The computer system as recited in claim 8, wherein creating the first anchor vertex comprises creating the at least one first transform.

10. The computer system as recited in claim 9, wherein the at least one first transform is based upon an interpolation of a coordinate location associated with the first mixed-reality element, which coordinate location is derived from coordinates associated with each of the key frames in the first set of key frames.

11. The computer system as recited in claim 9, wherein the at least one first transform includes a plurality of transforms that connect a plurality of respective key frames to the first mixed-reality element.

12. The computer system as recited in claim 1, wherein the first mixed-reality element comprises a hologram.

13. A method for using an anchor graph within a mixed-reality environment, comprising:
identifying a first device with a stored first anchor graph;
detecting that the first device is within a predetermined proximity to a first physical location; and
in response to detecting that the first device is within the predetermined proximity, transmitting a part of a first anchor vertex along with a first anchor edge to the first device, wherein:
the first anchor vertex comprises: a plurality of key frames including at least a first key frame, a first mixed-reality element, and at least one first transform connecting at least the first key frame to the first mixed-reality element, wherein the transmitting comprises transmitting the first key frame without transmitting all of the plurality of key frames from the first anchor vertex, and
the first anchor edge comprises a single transformation connecting the first anchor vertex to a second anchor vertex, wherein the second anchor vertex comprises at least one second key frame, a second mixed-reality element, and at least one second transform connecting the at least one second key frame to the second mixed-reality element, and wherein the first anchor edge omits one or more separate transforms between each of the key frames in the first anchor vertex and the second anchor vertex.

14. The method as recited in claim 13, further comprising:
receiving a new anchor vertex from the first device, wherein the new anchor vertex comprises at least one new key frame, a new mixed-reality element, and at least one new transform connecting the at least one new key frame to the new mixed-reality element;
receiving a new physical location that is associated with the physical location of the new anchor vertex; and
receiving a new anchor edge from the first device, wherein the new anchor edge comprises a transformation between the first anchor vertex and the new anchor vertex.

15. The method as recited in claim 14, further comprising:
identifying a second device with a stored second anchor graph;
detect that the second device is within a predetermined proximity to the second physical location; and
in response to detecting that the second device is within the predetermined proximity, transmit the second anchor vertex and the second anchor edge to the second device.

16. The method as recited in claim 13, wherein the first anchor edge omits key frames from the first plurality of key frames.

17. A method for using an anchor graph within a mixed-reality environment, comprising:
communicating, to a server, location data associated with a location of a first device; and
in response to communicating the location data to the server, receiving at least part of a first anchor vertex that is within a predetermined proximity to the first device and a first anchor edge, wherein:
the first anchor vertex comprises: a first plurality of key frames including at least a first key frame, a first mixed-reality element, and at least one first transform connecting at least the first key frame to the first mixed-reality element, and
the first anchor edge comprises a transformation connecting the first anchor vertex to a second anchor vertex comprising a second plurality of key frames including at least a second key frame, a second mixed-reality element, and at least one second transform connecting at least the second key frame to the second mixed-reality element, and wherein the first anchor edge omits one or more separate transforms between each of the key frames in the first anchor vertex and the second anchor vertex.

18. The method as recited in claim 17, further comprising:
associating a second mixed-reality element with a second physical location;
generating at least one second key frame that is associated with the second-mixed-reality element;
determining at least one second transform that connects the at least one second key frame to the second mixed-reality element
generating a second anchor vertex comprising the second mixed-reality element, the at least one second key frame, and the at least one second transform;
generating a second anchor edge that comprises a transformation connecting the first anchor vertex to the second anchor vertex; and
communicating, to the server, the second anchor vertex and the second anchor edge.

19. The method as recited in claim 18, wherein the second mixed-reality element comprises a hologram.

20. The method as recited in claim 17, wherein the first anchor edge omits all of the first plurality of key frames.

* * * * *